United States Patent [19]

Kavieff

[11] Patent Number: 4,883,401

[45] Date of Patent: Nov. 28, 1989

[54] ARTICLE HANDLING APPARATUS FOR THE STORAGE AND DELIVERY OF PLURAL TYPES OF ARTICLES

[75] Inventor: Shelden M. Kavieff, Farmington Hills, Mich.

[73] Assignee: Jervis B. Webb Company, Farmington Hills, Mich.

[21] Appl. No.: 260,734

[22] Filed: Oct. 21, 1988

[51] Int. Cl.$^4$ ................................................ B65G 1/06
[52] U.S. Cl. .................................. 414/273; 414/281; 414/331; 414/787
[58] Field of Search ............................... 414/266–268, 414/273, 331, 277–283, 787, 223

[56] References Cited

U.S. PATENT DOCUMENTS

| | | | |
|---|---|---|---|
| 2,718,972 | 9/1955 | Temple | 414/331 X |
| 3,779,403 | 12/1973 | Young | 414/281 X |
| 3,792,785 | 2/1974 | Weir | 414/281 X |
| 3,854,605 | 12/1974 | Proper et al. | 414/283 X |
| 3,920,195 | 11/1975 | Sills et al. | 414/273 X |
| 4,378,189 | 3/1983 | Takeshita et al. | 414/331 X |
| 4,534,692 | 8/1985 | Shiomi et al. | 414/282 |
| 4,651,863 | 3/1987 | Reuter et al. | 414/787 X |
| 4,787,803 | 11/1988 | van Elten et al. | 414/267 X |
| 4,787,804 | 11/1988 | Edenäs | 414/281 |

Primary Examiner—David A. Bucci
Attorney, Agent, or Firm—Joseph W. Farley

[57] ABSTRACT

An article storage and delivery system comprising a rack having vertical rows of article storage compartments, and a storage and retrieval machine movable along one side of the rack for selectively placing articles in and removing them from the compartments. An indexable turntable, having a plurality of circumferentially spaced article supports, is arranged at the opposite side of and partially within the rack so that each support is indexable into a machine accessible position, thereby enabling articles to be transferred by the machine between the storage compartments and the turntable supports. By dedicating each turntable support to a particular article type, different articles on the turntable are selectively deliverable by indexing movements thereof to a station on the turntable periphery externally of the rack.

5 Claims, 3 Drawing Sheets

ARTICLE HANDLING APPARATUS FOR THE STORAGE AND DELIVERY OF PLURAL TYPES OF ARTICLES

SUMMARY OF THE INVENTION

This invention relates to improvements in automatic storage and retrieval apparatus conventionally consisting of a rack structure having vertical rows of compartments each adapted to contain an article, and a machine movable along one side of the rack structure, the machine having a vertically movable carriage equipped with article handling means operable to place an article in or remove an article from a selected one of the compartments.

The improvements of the invention are directed to the handling of articles being withdrawn from storage in the rack structure and delivered to an adjacent station, as required at that station. When the articles in storage are of several different types, the invention provides rapid access at the delivery station to any one of the different types of articles and in any desired sequence. For example, the delivery station may be a workstation on a production line for work pieces which vary in their requirement for the type of part to be applied at the workstation, and which requirement is random in he sense that it does not appear at the workstation in any particular sequence. Work piece No. 1 may require part type A; work piece No. 2, part type C; work piece 3, part type C; work piece 4, part type F; etc.

One conventional solution to the problem of providing access at a delivery station to any one of a number of different type articles in a storage and retrieval facility is to provide an individual conveyor from the facility to the delivery station for each type of article. However, as the number of different types of articles increases, this solution becomes unworkable from the standpoint of space requirements alone. The present invention provides a solution which permits random access at the delivery to any one of a relatively large number of different type articles, by the employment of the apparatus to be described.

The article handling apparatus of the invention comprises a rack structure having opposite sides and vertical rows of compartments extending transversely of the sides, with each compartment being adapted to contain an article. A storage and retrieval machine, mounted for movement along one side of the rack structure includes a vertically movable carriage equipped with article handling means operable to place an article in or remove an article from a selected one of the compartments. An indexable turntable, having an axis of rotation and a plurality of article supports arranged about the axis in equidistantly spaced radial and circumferential relation, is mounted relative to the rack structure so that one portion of the turntable extend into and one portion projects from the side of the rack structure opposite to the storage and retrieval machine side. The arrangement of the turntable is such that in response to indexing movements thereof, each turntable article support is selectively positionable within the rack structure so as to form a transfer compartment accessible by the storage and retrieval machine. A suitable control, connected to the machine and to the turntable, correlates their respective movements so that articles are selectively transferable between the compartments of the rack structure and the article supports of the turntable.

A delivery station is located adjacent to the projecting portion of the turntable and is provided with a call command unit which is connected to the control and which provides command signals thereto indicating the type of article desired at the delivery station. In response to a command signal, the control will cause the turntable to be indexed so as to position at the delivery station the article support for any article selected by the command signal.

According to a preferred feature of the invention, when the articles to be handled consist of a number of different types, the turntable is provided with an equal number of article supports each dedicated to a particular article type. As the number of article types increases, the number of article supports is correspondingly increased, if necessary by arranging the article supports in vertically spaced tiers, with the article supports of one tier offset circumferentially from those of an adjacent tier. Multiple turntables can also be employed and the delivery station located between adjacent turntables, as may be required by the types and numbers of articles to be handled.

Conventionally, articles are handled industrially on pallets, trays or other form of device on which one or more items is placed. The term "tray" will be used herein to denote any such device, and the tray constitutes the article handled by the storage and retrieval machine and by the turntable. Each tray contains one or more identical items. The article handling apparatus includes a loaded tray receiving station and an empty tray removal station, each arranged so as to be accessible by the storage and retrieval machine. A tray entry signal command unit connected to the control is manually operated to provide command signals in response to which the control causes the storage and retrieval machine to transfer loaded trays from the receiving station to compartments of the storage rack structure and to memorize the compartment location and identity of each tray. The call command unit at the delivery station is operable to generate an empty tray signal in response to which the control causes the turntable to index the article support carrying an empty tray into the transfer compartment position within the rack structure, and causes the storage and retrieval machine to transfer the empty tray from the article support to the tray removal station and to transfer to the article support a full tray from a compartment of the rack structure.

The replacement on a turntable article support of an empty tray by a full tray can be expedited by dedicating for temporary use certain compartments in the rack structure adjacent to the transfer compartment position of the article support. In response to an empty tray signal, the control causes the storage and retrieval machine to withdraw a replacement tray from storage and place this tray in a temporary use compartment during the indexing movement of the turntable. The empty tray is removed from the turntable support, placed in an another adjacent temporary use compartment, and replaced by the full tray. Transfer of the empty tray to the tray removal station can then take place as time permits.

Other features and advantages of the invention will appear from the description to follow of the embodiment shown in the accompanying drawings.

DETAILED DESCRIPTION

Figure 2:
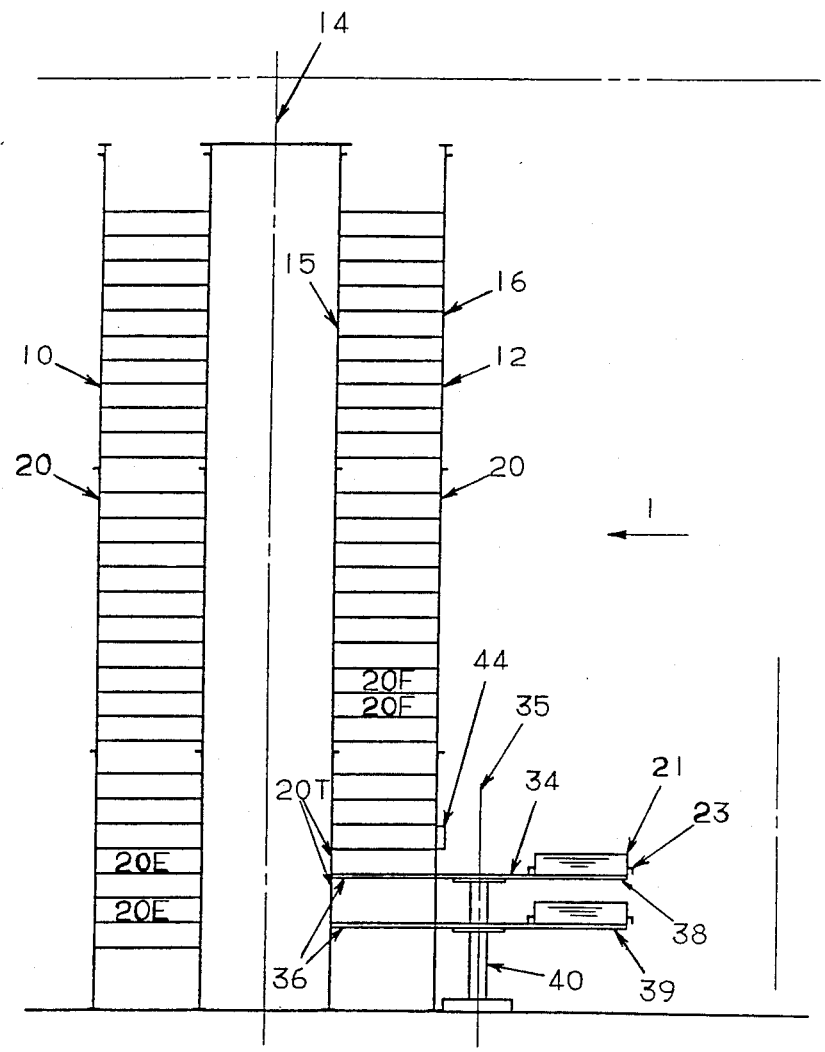
FIG. 2 is an end elevation showing the rack structure and turntable components of the apparatus of FIG. 1.
Figure 3:
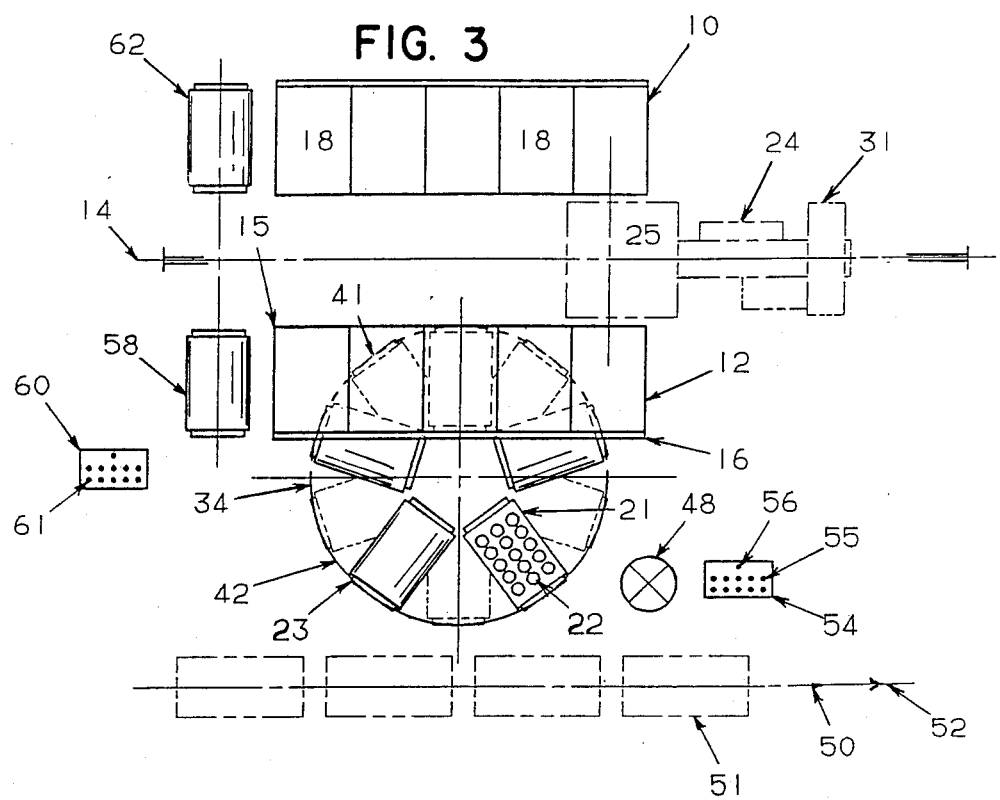
FIG. 3 is a plan view of the apparatus of FIG. 1 and further illustrating a delivery station and a work in process application of the invention.

FIGS. 2 and 3 illustrate two similar storage rack structures 10 and 12 arranged symmetrically relative to the centerline of an aisle 14. The left hand structure 10 as seen in FIG. 2 is optional in the sense that it is employed primarily as required to satisfy a desired article storage capacity; the right hand structure 12 will be described in detail. This structure 12 has opposite sides 15 and 16 and vertical rows 18 of compartments 20 extending transversely of the sides. Each compartment is adapted to contain an article 21, which as shown comprises a tray adapted to contain a plurality of items 22 (FIG. 3) and having a downwardly facing handle slot 23 (FIG. 2) at each of its ends.

Figure 1:
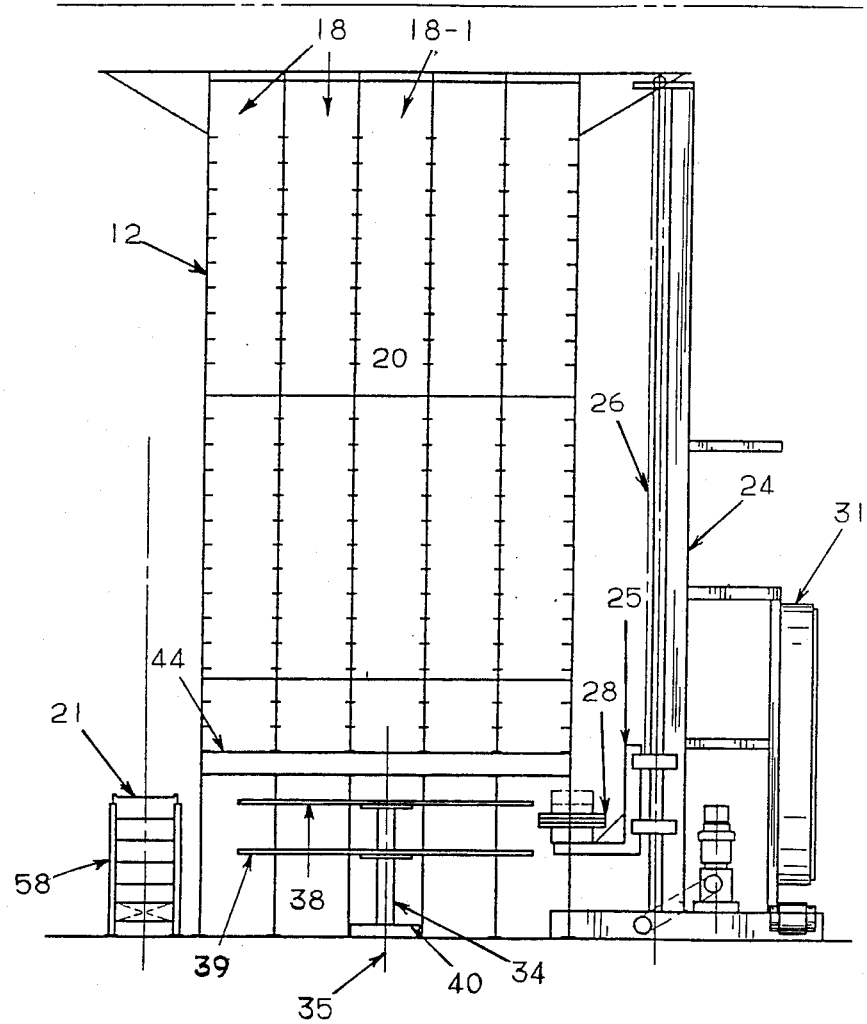
FIG. 1 is a side elevation of article handling apparatus of the invention, taken in the direction of the arrow 1 of FIG. 2.

Mounted on the aisle centerline 14 for movement along the side 15 of the rack structure 12 is a conventional automatic storage and retrieval machine 24 (FIG. 1). This machine 24 includes a carriage 25, movable vertically along a mast 26, and equipped with article handling means 28 operable to place an article 21 in or remove an article 21 from a selected one of the compartments 20. The exact nature of the article handling means 28 will depend upon the form of the article, as is known to those skilled in the automatic warehousing art. For the tray-type article 21 shown, the handling means 28 includes a mechanism having movable pins which engage a handle slot 23 and push the article 21 into or pull it from a compartment 20. Examples of such a mechanism appear in U.S. Pat. No. 4,010,885, or in U.S. patent application Ser. No. 07/114,688, filed Oct. 29, 1987, now U.S. Pat. No. 4,812,102 commonly owned with the present application.

The machine 24 further includes an on-board controller 30 (FIG. 4) which is contained within an enclosure 31, and which directly controls the drive motors for horizontal movement of the machine 24, vertical movement of the carriage 25, and movement of the article handling means 28.

An indexable turntable 34 is combined with the rack structure 12. This turntable 34 has an axis of rotation 35 and a plurality of article supports 36, which as best shown in FIG. 3 are arranged in radial and circumferentially spaced relation to the axis 35. The particular turntable construction shown has two vertically spaced tiers 38 and 39 of article supports 36, and as shown in FIG. 3, the article supports of one tier are offset circumferentially from the article supports of the other tier. There are a total of ten article supports 36 arranged in two tiers having five supports each.

Suitable turntable mounting means 40 positions the turntable 34 with its axis 35 disposed vertically, with one peripheral portion 41 (FIG. 3) projecting into and with another peripheral portion 42 projecting from the side 16 of the rack structure 12. As shown in FIG. 1, the turntable axis 35 is aligned with the center of one vertical row 18-1 of compartments 20 of the rack structure 12, which structure includes a longitudinal beam 44 extending above the turntable portion 41 along the side 16. The mounting of the turntable 34 is such that as shown in FIGS. 2 and 3, each of the article supports 36 in response to turntable indexing movements is positionable within the rack structure 12 so as to form a transfer compartment 20T accessible by the article handling means 28 of the machine 24, there being one such transfer compartment 20T for each tier of the turntable.

Figure 4:
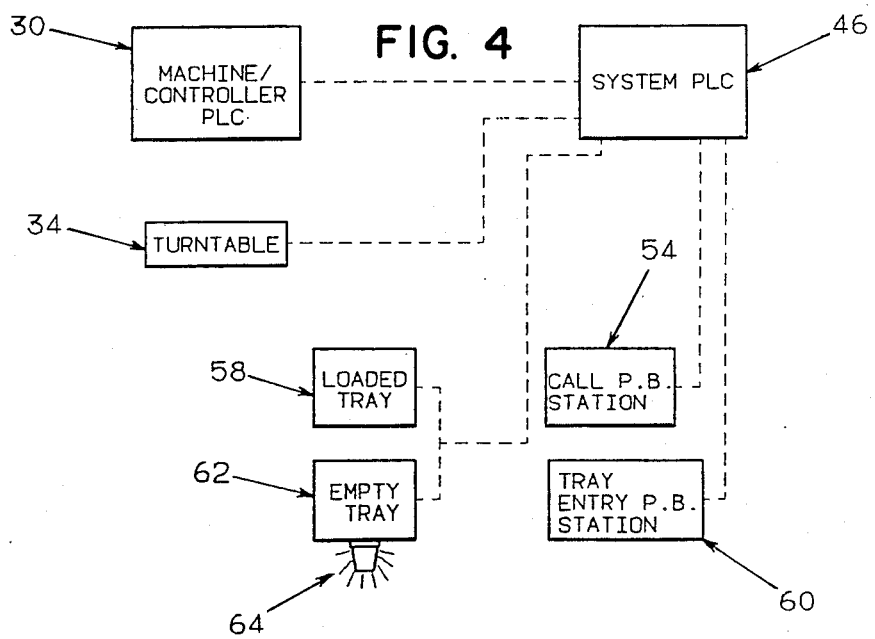
FIG. 4 is a schematic view illustrating the relation between the components of the apparatus and the control elements therefor.

Control means 46, shown as a SYSTEM PLC in FIG. 4, is connected to the controller 30 of the machine 24 and to the turn table 34 for correlating their respective movements so that articles 21 are selectively transferrable between the compartments 20 and the article supports 36 of the turntable 34 when indexed to the transfer compartment position 20T.

Other control elements are included in the apparatus shown which illustrates an application of the invention for supplying articles to a delivery station 48 (FIG. 3) located adjacent to the projecting peripheral portion 42 of the turntable 34 and to a processing line 50 for successive work pieces 51 advancing in the direction indicated by the arrow 52. To further illustrate this application of the invention, it will be assumed that the work pieces 51 each require the installation at the station 48 of one of ten different types of a part, and that this is a random requirement in that the part types required will not occur in any particular sequence.

For this application of the invention, each article 21 consists of a tray containing a group of identical items or parts 22 of one particular type; there are ten different types of the parts 22, hence ten different types of trays or articles 21; and there are ten article supports 36 on the turntable 34. Each of the article supports 36 is dedicated to the handling of one type of article 21 and this information is made a part of the logic of the control system PLC 46. The delivery station 48 is provided with a manually operable call command unit 54 which is connected to the control system PLC 46, is equipped with ten push buttons 55 each adapted to provide a command signal for one of the article types, and is equipped with one push button 56 adapted to provide an empty tray signal. The control PLC 46, in response to a command signal from one of the push buttons 55, is adapted to cause the turntable 34 to index to the delivery station 48 the article support 36 for the article type selected.

Referring to FIG. 3, the apparatus also includes a loaded tray receiving station 58 provided with a tray entry command unit 60 equipped with ten push buttons 61, and an empty tray removal station 62. Each of the stations 58 and 62 is arranged so as to be accessible by the article handling means 28 of the machine 24. Each of the stations 58 and 62 includes a sensing device such as a limit switch (not shown) which is connected to the control PLC 46 as shown in FIG. 4 and provides a station full signal. A station full signal from the tray receiving station 58 initiates a loading cycle in which the control PLC 46 causes the machine 24 to transfer loaded trays 21 from the receiving station to compartments of the storage rack structures 10 and 12, with the identity of the article type being entered manually by a signal from the appropriate one of the push buttons 61. In this storage operation, the storage compartment location of each tray is entered in the memory of the control PLC 46, in a known manner.

When one of the trays 21 on the turntable 34 is emptied, a manually entered signal from the empty tray push button 56 of the call command unit 54, together with a signal from the appropriate one of the push buttons 55 identifying the type of article are provided to the control PLC 46. In response to these signals, the control PLC 46 causes the turntable 34 to index to the transfer compartment position 20T the article support 36 carrying the empty tray, causes the machine 24 to transfer the empty tray to the tray removal station 62, and causes the machine 24 to transfer from a compartment 20 a full tray of the same type article. This empty tray replacement process is preferably expedited by dedicating for temporary use certain compartments 20 adjacent to the transfer compartment positions 20T. For example, referring to FIG. 2, the two compartments 20F immediately above the upper transfer position compartment 20T may be dedicated for the temporary placement of full trays; and the two compartments 20E in the rack structure 10 opposite the transfer position compartments 20T may be dedicated for the temporary placement of empty trays. The logic of the control PLC 46 is then arranged so that upon receipt of the empty tray condition and identity signals from the call command unit 54, the machine 24 is caused to remove a full tray from storage while the turntable is indexed, to place this full tray in one of the dedicated compartments 20F, to transfer the empty tray from the transfer position compartment 20T to the opposite one of the dedicated empty tray compartments 20E, and to then transfer the full tray from the compartment 20F to the empty turntable article support 36 at the transfer position compartment. The machine 24 will subsequently transfer the empty tray to the tray removal station 62 as time permits. When that station becomes full, the resulting signal to the control PLC will cause a beacon 64 (FIG. 4) or other signaling device to be energized indicating that the group of empty trays is to be taken away.

While manually operated call and tray entry command units 54 and 60 have been described for article identity, those skilled in the art will appreciate the equivalency of establishing the identity of each article by a machine-readable code carried thereby. Such a code can be sensed by a reader at the receiving station 58, or on the carriage 25 of the machine 24, or at both of these places; also by a reader at the delivery station 48 combined with a device for sensing an empty tray condition.

I claim:
1. Article handling apparatus comprising:
a rack structure having opposite sides and vertical rows of compartments extending transversely of said sides; each compartment being adapted to contain an article;
a storage and retrieval machine mounted for movement along one side of said rack structure, said machine including a vertically movable carriage, and article handling means on said carriage operable to place an article in or remove an article from a selected one of said compartments;
an indexable turntable having an axis of rotation and a plurality of article supports spaced radially and circumferentially relative to said axis;
means for mounting said turntable with the axis thereof disposed vertically and with peripheral portions thereof extending into and projecting from the other side of said rack structure whereby in response to indexing movements of said turntable each of said article supports is selectively positionable within said rack structure so as to form a transfer compartment accessible by said storage and retrieval machine; and control means connected to said storage and retrieval machine and to said turntable for correlating the respective movements thereof whereby articles are selectively transferable between said compartments and said article supports of said turntable.

2. Article handling apparatus according to claim 1 further comprising an article delivery station located adjacent to the turntable projecting portion at the other side of the rack structure; a call command unit at said delivery station, said call command unit being connected to said control means, said control means being adapted in response to a signal from said call command unit to cause any selected article support of said turntable to be indexed to said delivery station.

3. Article handling apparatus according to claim 2 wherein the articles to be handled comprise a number N of different types of articles, said plurality of turntable article supports equal said number N with each article support being dedicated to one type of article, said command unit includes selectively operable signaling means for identifying each type of article, and said control means in response to said signaling means is adapted to cause an indexing movement of said turntable such as to place at the delivery station the article support dedicated to the article identified by the signaling means.

4. Article handling apparatus according to claim 3 wherein the turntable article supports are arranged in a plurality of vertically spaced tiers, the article supports of one tier being offset circumferentially from the article supports of an adjacent tier.

5. Article handling apparatus according to claim 3 wherein each article to be handled comprises a tray adapted to contain one or more identical items, a loaded tray receiving station and an empty tray removal station each arranged so as to be accessible by said machine, a tray entry signal command unit connected to said control means, said control means being adapted in response to signals from said tray entry command unit to cause said machine to transfer loaded trays from said receiving station to compartments of said storage rack structure, and said call command unit includes means for generating an empty tray signal, said control means being adapted in response to said empty tray signal to cause said turntable to index the article support carrying an empty tray into said transfer compartment position within said rack structure and to cause said machine to transfer said empty tray from said article support to said tray removal station.

* * * * *

UNITED STATES PATENT AND TRADEMARK OFFICE
CERTIFICATE OF CORRECTION

PATENT NO. : 4,883,401
DATED : November 28, 1989
INVENTOR(S) : Shelden M. Kavieff It is certified that error appears in the above-identified patent and that said Letters Patent is hereby corrected as shown below:

Column 1, line 28, "he" should read --the--

Column 1, line 59, "extend" should read --extends--

Signed and Sealed this

Sixth Day of November, 1990

*Attest:*

HARRY F. MANBECK, JR.

*Attesting Officer*     *Commissioner of Patents and Trademarks*